(12) United States Patent
Hoshino

(10) Patent No.: US 11,241,644 B2
(45) Date of Patent: Feb. 8, 2022

(54) ADAPTER FOR FILTER DEVICE AND METHOD OF USE

(71) Applicant: Pall Corporation, Port Washington, NY (US)

(72) Inventor: Tatsuya Hoshino, Ryugasaki (JP)

(73) Assignee: Pall Corporation, Port Washington, NY (US)

( * ) Notice: Subject to any disclaimer, the term of this patent is extended or adjusted under 35 U.S.C. 154(b) by 150 days.

(21) Appl. No.: 16/846,574

(22) Filed: Apr. 13, 2020

(65) Prior Publication Data

US 2021/0316236 A1    Oct. 14, 2021

(51) Int. Cl.
  *B01D 35/30* (2006.01)
  *B01D 29/13* (2006.01)
  *B01D 29/66* (2006.01)

(52) U.S. Cl.
  CPC ........... *B01D 35/306* (2013.01); *B01D 29/13* (2013.01); *B01D 29/66* (2013.01); *B01D 2201/085* (2013.01); *B01D 2201/302* (2013.01); *B01D 2201/306* (2013.01)

(58) Field of Classification Search
  CPC ...... B01D 35/306; B01D 29/13; B01D 29/66; B01D 2201/085; B01D 2201/302; B01D 2201/306; B01D 29/21; B01D 2201/0407; B01D 2201/291; B01D 35/00; B01D 35/30; B01D 2201/307; B01D 2201/313; B01D 2201/40; B01D 2201/30; B01D 2201/301

USPC .................. 210/455, 485, 440–444, DIG. 17
See application file for complete search history.

(56) References Cited

U.S. PATENT DOCUMENTS

| 6,846,409 | B2 | 1/2005 | Laverdiere et al. |
| 7,195,122 | B2 | 3/2007 | Hiranaga et al. |
| 8,069,991 | B2 | 12/2011 | Norris et al. |
| 2005/0173319 | A1* | 8/2005 | Fritze ..................... B01D 61/10 210/137 |
| 2011/0127210 | A1 | 6/2011 | Suzuki |

FOREIGN PATENT DOCUMENTS

WO    WO 2005/068047 A1    7/2005

OTHER PUBLICATIONS

European Patent Office, Extended European Search Report in counterpart European Patent Application No. 21163505.7.

* cited by examiner

*Primary Examiner* — Madeline Gonzalez
(74) *Attorney, Agent, or Firm* — Leydig Voit & Mayer, Ltd.

(57) ABSTRACT

An adapter for use in a filter device is provided, the adapter having a downwardly slanted inner wall including two or more hollow passageways, and a central fluid flow port, wherein the adapter can be welded to a filter device housing head.

20 Claims, 12 Drawing Sheets

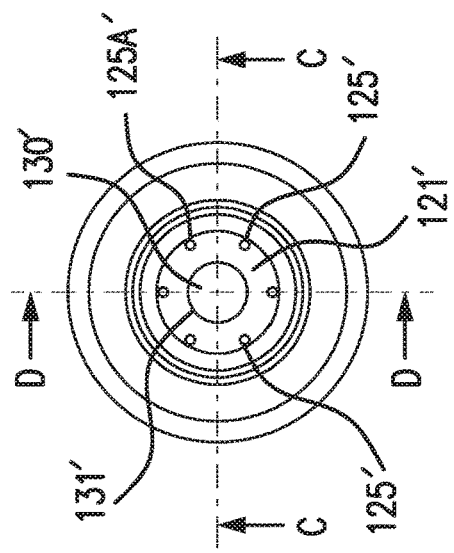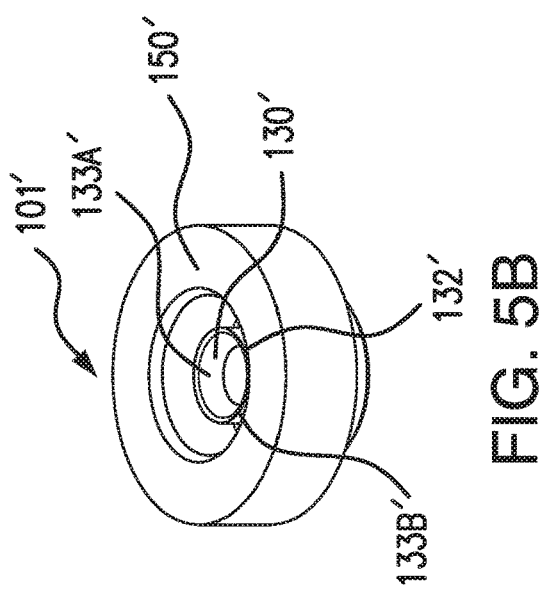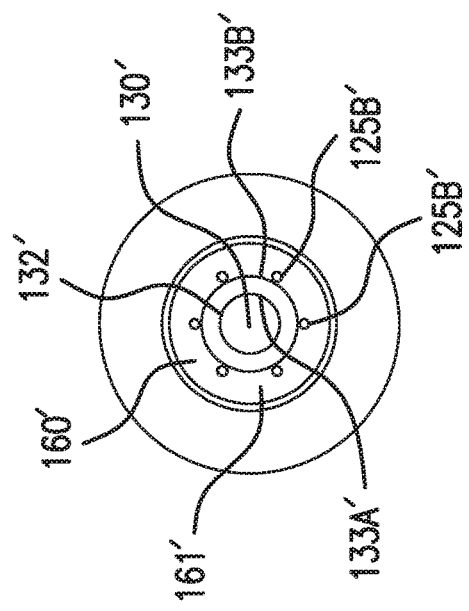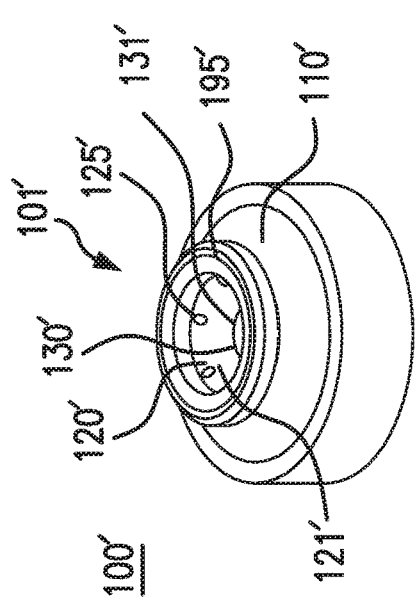
FIG. 5A
FIG. 5B
FIG. 5C
FIG. 5D

ADAPTER FOR FILTER DEVICE AND METHOD OF USE

BACKGROUND OF THE INVENTION

Some filter devices require the use of an adapter when installing a filter into a filter housing when the filter comprises a polymer that is different than the filter housing polymer. However, there is a need for improved filter devices.

The present invention provides for ameliorating at least some of the disadvantages of the prior art. These and other advantages of the present invention will be apparent from the description as set forth below.

BRIEF SUMMARY OF THE INVENTION

An embodiment of the invention provides a filter device comprising: (a) a filter comprising a hollow cylindrical filter element comprising a porous medium, arranged in a filter housing comprising an outer cage, an inner core, a first end cap, and a second end cap, wherein the outer cage and inner core are sealed to the first end cap and the second end cap with the filter element between the outer cage and the inner core, the second end cap comprising a closed end cap and the first end cap comprising an open end cap including a hollow projection comprising a filter outlet, the hollow projection having an external wall; (b) a filter device housing comprising a head including an inlet port and an outlet port, and a bowl having an interior for receiving the filter; (c) an adapter comprising a hollow body having: (i) a top portion having a top portion tapered inner diameter, wherein the top portion tapered inner diameter has a maximum diameter and a minimum diameter; (ii) a bottom portion; and (iii) a central fluid flow port passing through the hollow body, the central fluid flow port having a first end and a second end, an inside wall and an outside wall, the central fluid flow port being in fluid communication with the filter outlet; the top portion including a downwardly slanted inner wall providing the top portion tapered inner diameter, the downwardly slanted inner wall being connected to the first end of the central fluid flow port at the minimum diameter of the top portion tapered inner diameter, the downwardly slanted inner wall having an upper surface and two or more hollow passageways passing through the upper surface of the downwardly slanted inner wall, each of the two or more hollow passageways including an upper passageway end and a lower passageway end, the upper surface of the downwardly slanted inner wall including the upper passageway ends; the bottom portion including a downwardly extending hollow tubular element including the second end of the central fluid flow port, the hollow tubular element providing the inside wall and outside wall of the central fluid flow port; the bottom portion including an annular channel surrounding the downwardly extending hollow tubular element, the annular channel comprising a base, an outer side wall, and an inner side wall comprising the outside wall of the central fluid flow port, the base of the annular channel including the lower passageway ends of the two or more hollow passageways; wherein the outer side wall of the annular channel seals against the external wall of the hollow projection comprising the filter outlet, and the adapter is welded to the filter device housing head and to the top portion of the adapter; and wherein a fluid flow path passes though the inlet port, the outer cage, the porous medium, the filter outlet, the adapter central fluid flow port, and the outlet port.

In accordance with another embodiment, an adapter for use in a filter device comprises: a hollow body having: (i) a top portion having a top portion tapered inner diameter, wherein the top portion tapered inner diameter has a maximum diameter and a minimum diameter; (ii) a bottom portion; and (iii) a central fluid flow port passing through the hollow body, the central fluid flow port having a first end and a second end, an inside wall and an outside wall, the central fluid flow port being in fluid communication with the filter outlet; the top portion including a downwardly slanted inner wall providing the top portion tapered inner diameter, the downwardly slanted inner wall being connected to the first end of the central fluid flow port at the minimum diameter of the top portion tapered inner diameter, the downwardly slanted inner wall having an upper surface and two or more hollow passageways passing through the upper surface of the downwardly slanted inner wall, each of the two or more hollow passageways including an upper passageway end and a lower passageway end, the upper surface of the downwardly slanted inner wall including the upper passageway ends; the bottom portion including a downwardly extending hollow tubular element including the second end of the central fluid flow port, the hollow tubular element providing the inside wall and outside wall of the central fluid flow port; the bottom portion including an annular channel surrounding the downwardly extending hollow tubular element, the annular channel comprising a base, an outer side wall, and an inner side wall comprising the outside wall of the central fluid flow port, the base of the annular channel including the lower passageway ends of the two or more hollow passageways.

BRIEF DESCRIPTION OF THE SEVERAL VIEWS OF THE DRAWING(S)

FIG. 1A is cross-sectional view of an embodiment of a filter device including a filter device housing, a filter, and an adapter including a downwardly slanted inner wall and a slanted hollow passageway according to an embodiment of the invention, wherein the adapter is welded to the filter device housing, and the adapter is sealed to an end of the filter; FIG. 1B is a top view of the filter device shown in FIG. 1A, and FIG. 1C is a left side view of the filter device shown in FIG. 1A.

FIG. 2A is a top perspective view of the embodiment of the adapter shown in the filter device shown in FIG. 1A; FIG. 2B is a bottom perspective view, FIG. 2C is a top view; FIG. 2D is a bottom view, FIG. 2E is a sectional view along line A-A of FIG. 2C, and FIG. 2F is a sectional view along line B-B of FIG. 2C.

FIG. 3 is a cross-sectional view of the filter in the filter device shown in FIG. 1A.

FIG. 4A is cross-sectional view of an embodiment of a filter device including a filter device housing, a filter, and an adapter including a downwardly slanted inner wall and a hollow passageway according to an embodiment of the invention, wherein the adapter is welded to the filter device housing, and the adapter is sealed to an end of the filter; FIG. 4B is a top view of the filter device shown in FIG. 4A, and FIG. 4C is a left side view of the filter device shown in FIG. 4A.

FIG. 5A is a top perspective view of the embodiment of the adapter shown in the filter device shown in FIG. 4A; FIG. 5B is a bottom perspective view, FIG. 5C is a top view; FIG. 5D is a bottom view, FIG. 5E is a sectional view along line C-C of FIG. 5C, and FIG. 5F is a sectional view along line D-D of FIG. 5C.

DETAILED DESCRIPTION OF THE INVENTION

Figure 1A:
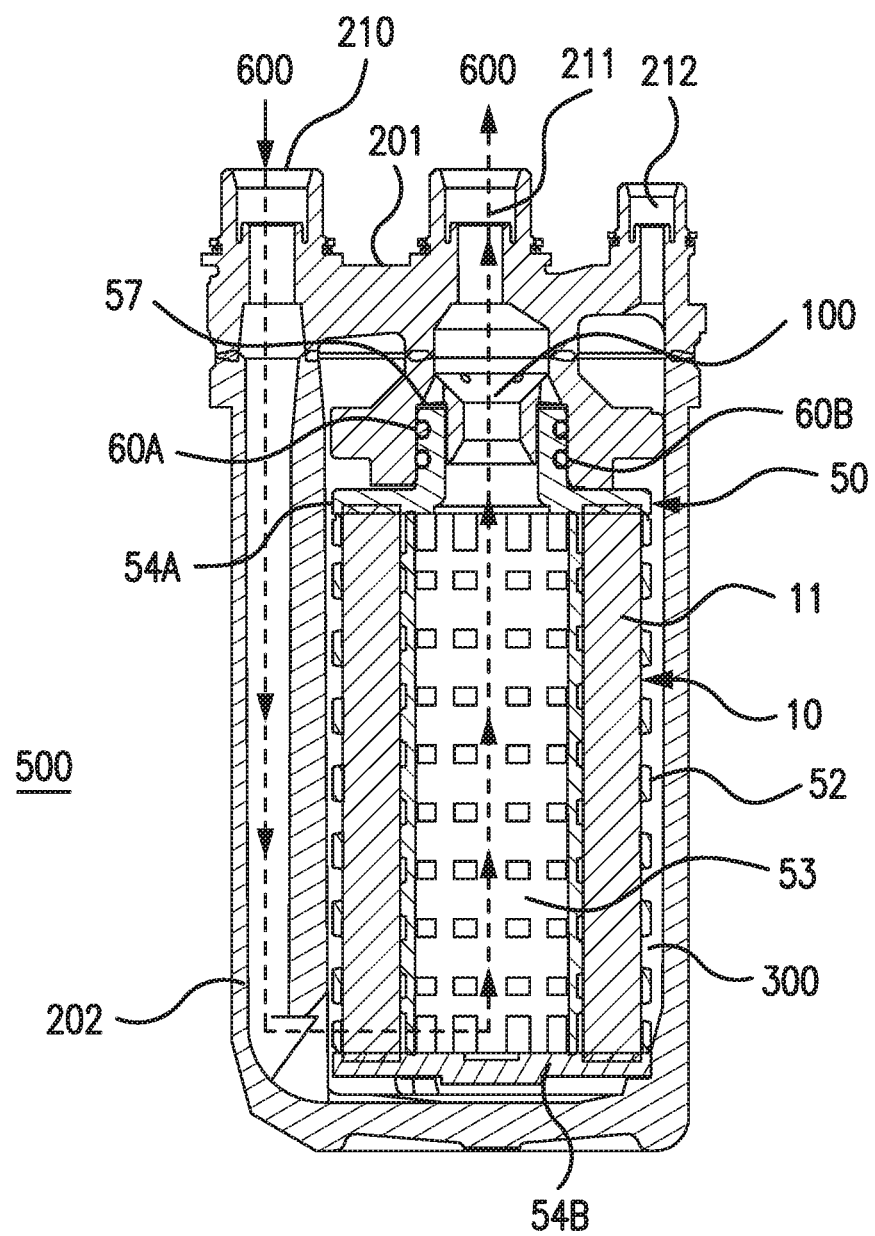

In accordance with an embodiment of the invention, a filter device is provided comprising: (a) a filter comprising a hollow cylindrical filter element comprising a porous medium, arranged in a filter housing comprising an outer cage, an inner core, a first end cap, and a second end cap, wherein the outer cage and inner core are sealed to the first end cap and the second end cap with the filter element between the outer cage and the inner core, the second end cap comprising a closed end cap and the first end cap comprising an open end cap including a hollow projection comprising a filter outlet, the hollow projection having an external wall; (b) a filter device housing comprising a head including an inlet port and an outlet port, and a bowl having an interior for receiving the filter; (c) an adapter comprising a hollow body having: (i) a top portion having a top portion tapered inner diameter, wherein the top portion tapered inner diameter has a maximum diameter and a minimum diameter; (ii) a bottom portion; and (iii) a central fluid flow port passing through the hollow body, the central fluid flow port having a first end and a second end, an inside wall and an outside wall, the central fluid flow port being in fluid communication with the filter outlet; the top portion including a downwardly slanted inner wall providing the top portion tapered inner diameter, the downwardly slanted inner wall being connected to the first end of the central fluid flow port at the minimum diameter of the top portion tapered inner diameter, the downwardly slanted inner wall having an upper surface and two or more hollow passageways passing through the upper surface of the downwardly slanted inner wall, each of the two or more hollow passageways including an upper passageway end and a lower passageway end, the upper surface of the downwardly slanted inner wall including the upper passageway ends; the bottom portion including a downwardly extending hollow tubular element including the second end of the central fluid flow port, the hollow tubular element providing the inside wall and outside wall of the central fluid flow port; the bottom portion including an annular channel surrounding the downwardly extending hollow tubular element, the annular channel comprising a base, an outer side wall, and an inner side wall comprising the outside wall of the central fluid flow port, the base of the annular channel including the lower passageway ends of the two or more hollow passageways; wherein the outer side wall of the annular channel seals against the external wall of the hollow projection comprising the filter outlet, and the adapter is welded to the filter device housing head and to the top portion of the adapter; and wherein a fluid flow path passes though the inlet port, the outer cage, the porous medium, the filter outlet, the adapter central fluid flow port, and the outlet port.

In a preferred embodiment, the adapter and the filter device housing (especially the filter device housing head) each comprise a fluoropolymer, more preferably, a perfluoroalkoxy alkane (PFA).

In an embodiment, the filter (especially the first end cap) comprises polypropylene or polyethylene.

In accordance with another embodiment, an adapter for use in a filter device comprises: a hollow body having: (i) a top portion having a top portion tapered inner diameter, wherein the top portion tapered inner diameter has a maximum diameter and a minimum diameter; (ii) a bottom portion; and (iii) a central fluid flow port passing through the hollow body, the central fluid flow port having a first end and a second end, an inside wall and an outside wall, the central fluid flow port being in fluid communication with the filter outlet; the top portion including a downwardly slanted inner wall providing the top portion tapered inner diameter, the downwardly slanted inner wall being connected to the first end of the central fluid flow port at the minimum diameter of the top portion tapered inner diameter, the downwardly slanted inner wall having an upper surface and two or more hollow passageways passing through the upper surface of the downwardly slanted inner wall, each of the two or more hollow passageways including an upper passageway end and a lower passageway end, the upper surface of the downwardly slanted inner wall including the upper passageway ends; the bottom portion including a downwardly extending hollow tubular element including the second end of the central fluid flow port, the hollow tubular element providing the inside wall and outside wall of the central fluid flow port; the bottom portion including an annular channel surrounding the downwardly extending hollow tubular element, the annular channel comprising a base, an outer side wall, and an inner side wall comprising the outside wall of the central fluid flow port, the base of the annular channel including the lower passageway ends of the two or more hollow passageways.

Advantageously, dead space in the filter device is reduced. For example, dead space can be reduced during assembly of the filter device, and dead space can be reduced while preparing the filter device for shipping (e.g., including cleaning with a cleaning fluid such as an acid, and replacing the cleaning fluid with deionized water) advantageously allowing quick and efficient liquid displacement. Moreover, process start up time of the installed filter device at the user's site can be reduced.

In another advantage, the adapter provides a heat shield to prevent melting filter components during welding, and also provides efficient sealing.

In an embodiment, a method of assembling a filter device comprises placing an embodiment of an adapter including hollow passageways according to the invention on top of a filter comprising a hollow cylindrical filter element comprising a porous medium, arranged in a filter housing comprising a first end cap, and a second end cap, the second end cap comprising a closed end cap and the first end cap comprising an open end cap including a hollow projection comprising a filter outlet, the hollow projection having an external wall, wherein the filter is arranged in a bowl of a filter device housing; pushing the adapter downwardly and passing some air present in the filter and/or bowl of the filter device housing through the hollow passageways; and, welding a head of the filter device housing and passing the air passing through the hollow passageways through an outlet port in the head of the filter device housing.

In accordance with another embodiment of the invention, a method of cleaning a filter is provided, the method comprising passing a cleaning fluid through an embodiment of the filter device, and passing deionized water through the filter device to flush the cleaning fluid from the filter device.

In accordance with another embodiment of the invention, a method of filtering a fluid is provided, the method comprising passing fluid along a fluid flow path through an embodiment of the filter device. For example, fluid is passed through the inlet port, the filter, and the filtered fluid passes through the filter outlet, the adapter central fluid flow port, and the outlet port. In some embodiments, the method includes venting air or gas through the vent port, before filtration, and, if appropriate, during filtration.

Each of the components of the invention will now be described in more detail below, wherein like components have like reference numbers.

Figure 1B:
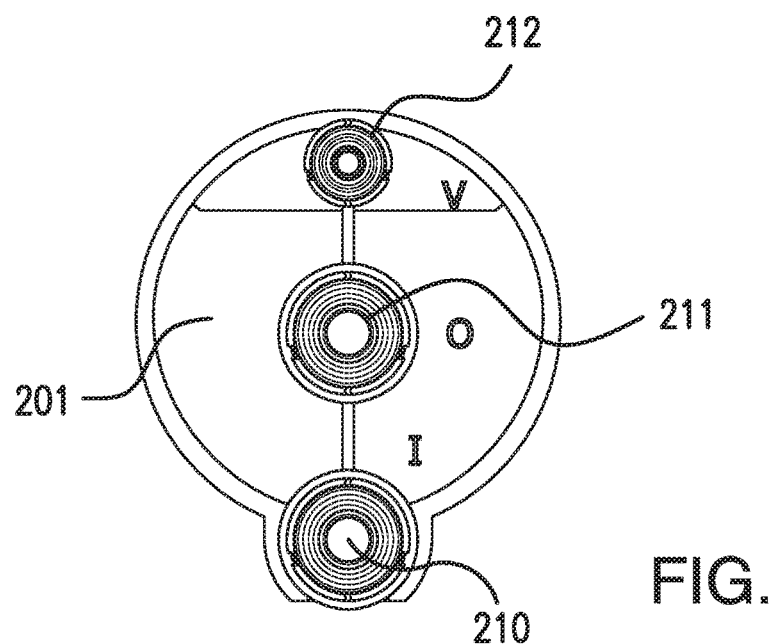
Figure 1C:
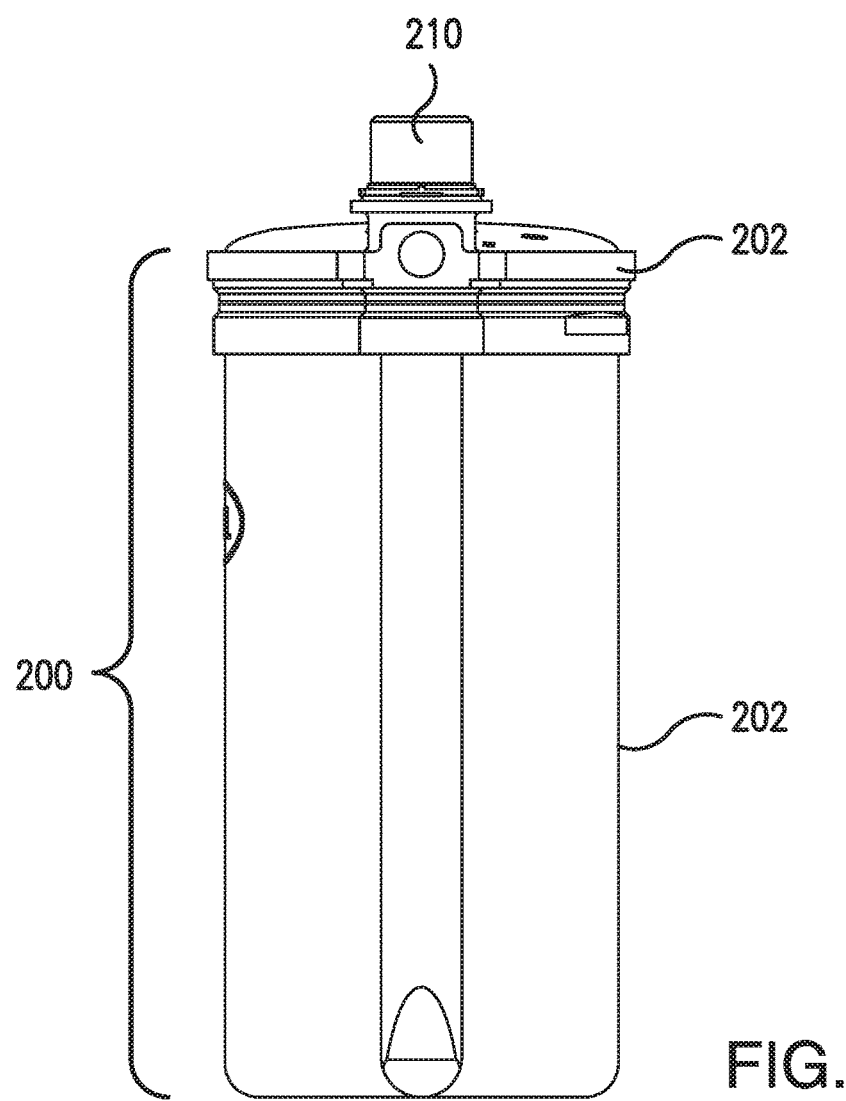

FIG. 1A is cross-sectional view of an embodiment of a filter device 500 including an adapter 100 according to an embodiment of the invention, wherein the adapter is welded to the filter device housing 200, and the adapter is sealed to an end of the filter 50. FIG. 1B is a top view of the head 201 of the filter device, and FIG. 1C is a left side view of the filter device showing the filter device housing.

Figure 3:
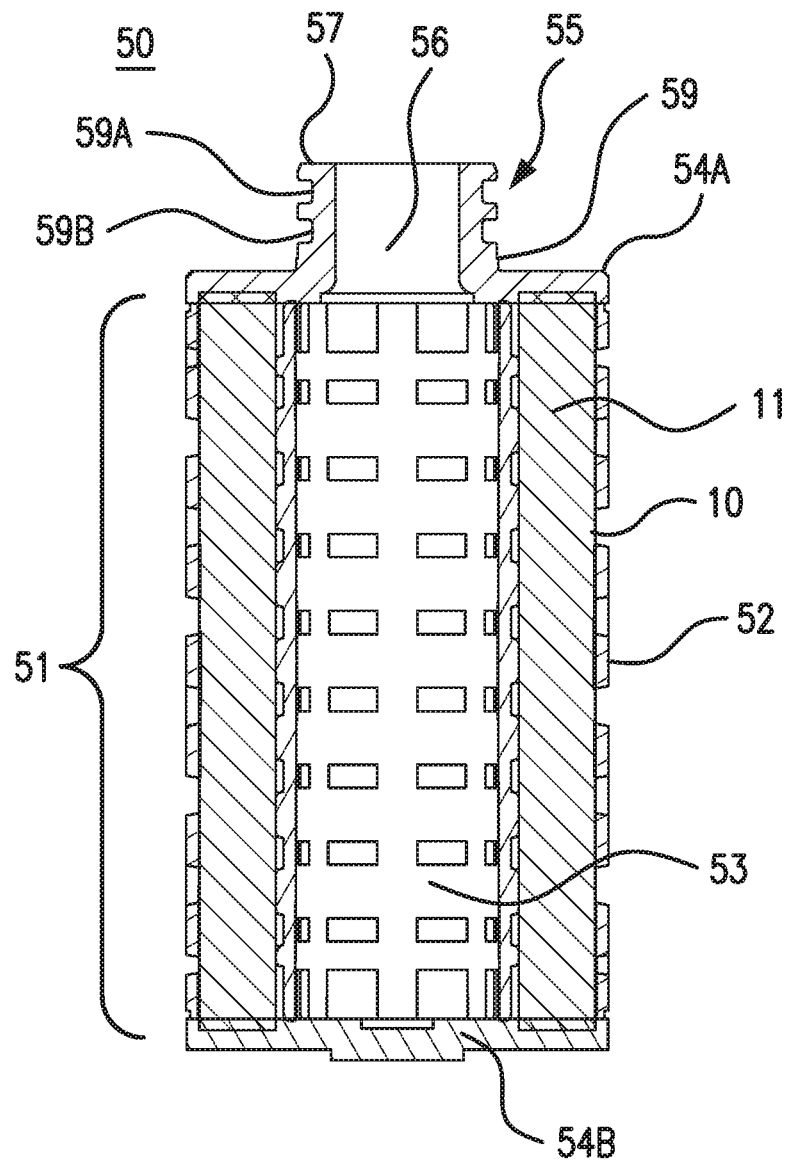

In accordance with the embodiment shown in FIG. 1A, the filter device 500 comprises a filter device housing 200 comprising a head 201 including an inlet port 210 and an outlet port 211, and a bowl 202 having an interior 300 for receiving a filter 50 (shown in more detail in FIG. 3), the filter comprising a hollow cylindrical filter element 10 comprising a porous medium 11, arranged in a filter housing 51 comprising an outer cage 52, an inner core 53, a first end cap 54A, and a second end cap 54B, wherein the outer cage and inner core are sealed to the first end cap and the second end cap with the filter element between the outer cage and the inner core, the second end cap comprising a closed end cap and the first end cap comprising an open end cap including a hollow projection 55 comprising a filter outlet 56, the hollow projection having a top wall 57, an inner wall 58, and an external wall 59 including grooves 59A, 59B, for receiving resilient members 60A, 60B, shown as o-rings.

In accordance with this illustrated embodiment, an adapter 100 (shown in more detail in FIGS. 2A-2F) comprises a hollow body 101 having a top portion 110 having a top portion tapered inner diameter 111, wherein the top portion tapered inner diameter has a maximum diameter 111A and a minimum diameter 111B; a bottom portion 150; and a central fluid flow port 130 passing through the hollow body 101, the central fluid flow port having a first end 131 and a second end 132, an inside wall 133A and an outside wall 133B, the central fluid flow port 130 being in fluid communication with the filter outlet 56; the top portion 110 including a downwardly inwardly slanted inner wall 120 providing the top portion tapered inner diameter 111, the downwardly slanted inner wall 120 being connected to the first end 131 of the central fluid flow port at the minimum diameter 111B of the top portion tapered inner diameter, the downwardly slanted inner wall having an upper surface 121 and two or more hollow passageways 125 (6 passageways are illustrated) passing through the upper surface 121 of the downwardly slanted inner wall, each of the two or more hollow passageways 125 including an upper passageway end 125A and a lower passageway end 125B, the upper surface 121 of the downwardly slanted inner wall including the upper passageway ends 125A; the bottom portion 150 including a downwardly extending hollow tubular element 151 including the second end 132 of the central fluid flow port, the hollow tubular element 151 providing the inside wall 133A and outside wall 133B of the central fluid flow port 130; the bottom portion 150 including an annular channel 160 surrounding the downwardly extending hollow tubular element 151, the annular channel comprising a base 161, an outer side wall 162, and an inner side wall 163 comprising the outside wall 133B of the central fluid flow port, the base 161 of the annular channel 160 including the lower passageway ends 125B of the two or more hollow passageways 125.

Figure 2B:
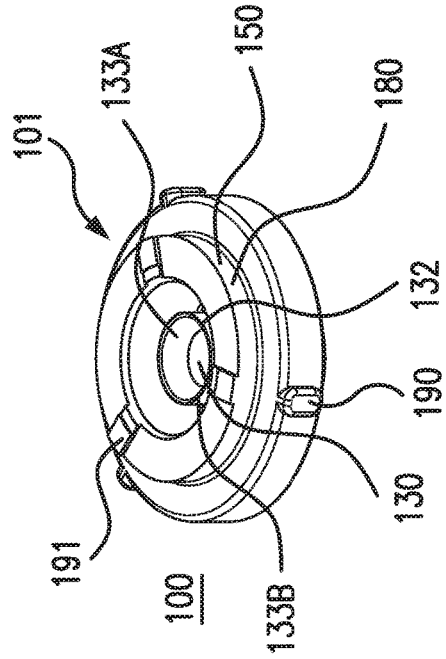
Figure 2D:
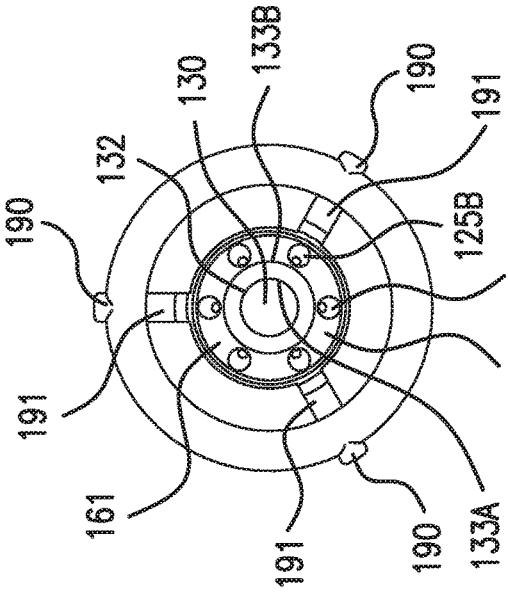
Figure 2A:
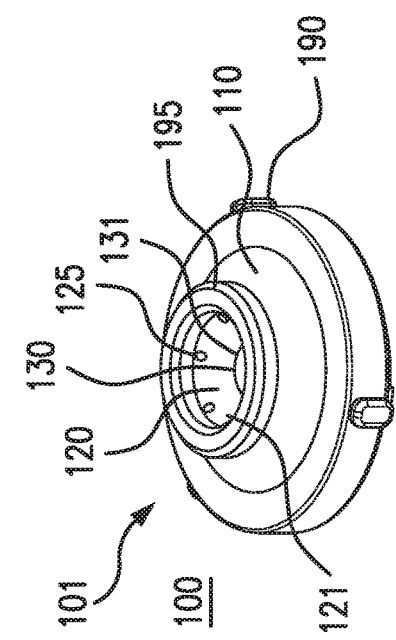
Figure 2C:
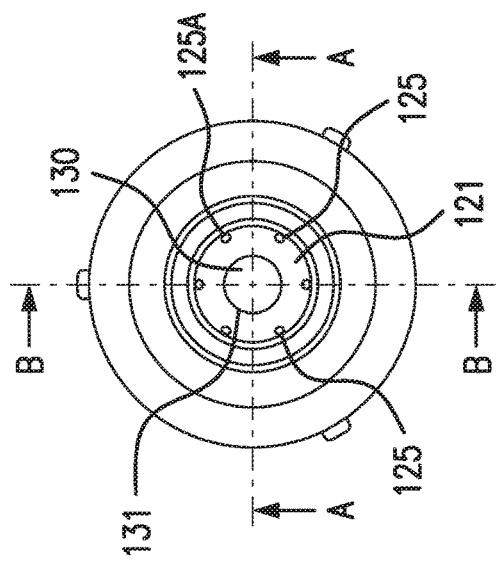
Figure 2F:
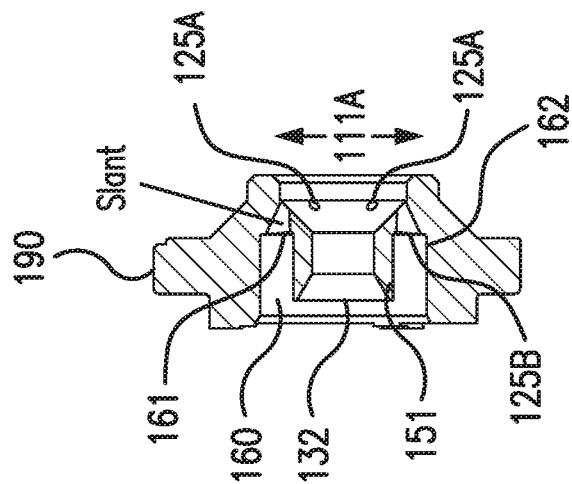
Figure 2E:
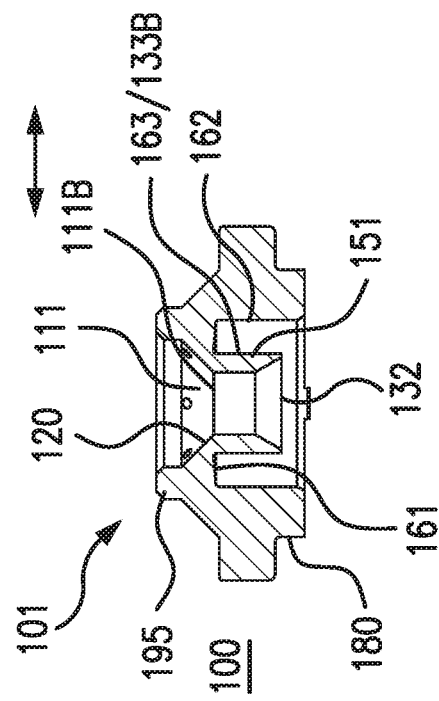
Figure 5E:
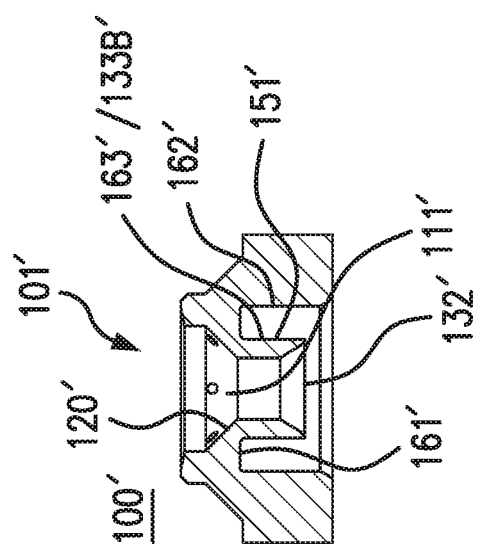
Figure 5F:
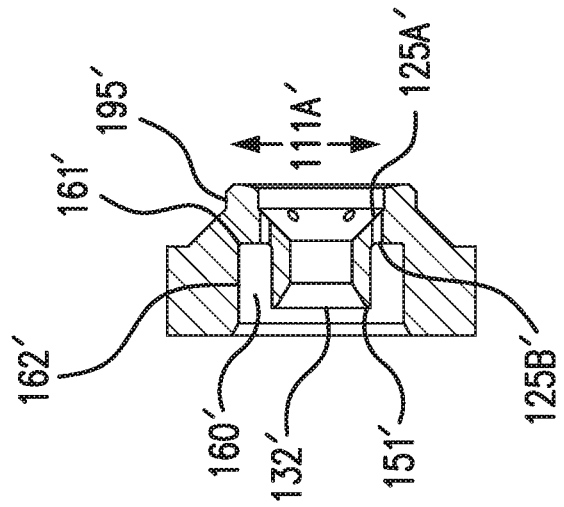
Figure 7A:
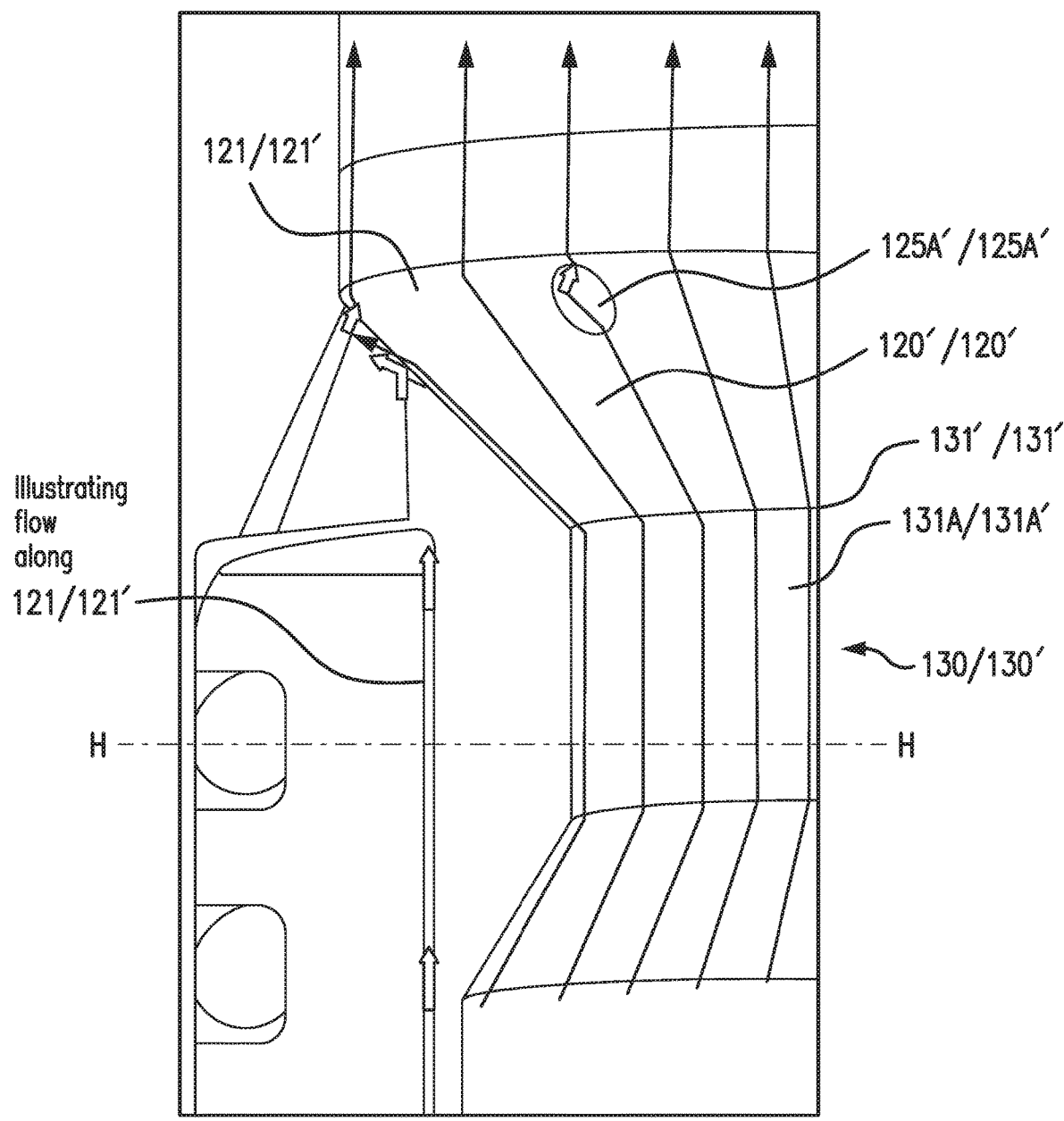
FIG. 7A is a partial diagrammatic view of the filter device shown in FIG. 1, showing flow along fluid flow paths along the central fluid flow path (black arrows), and through a hollow passageway (white arrows), in the adapter.

As shown in FIG. 2F, and in contrast with the embodiment of the adapter 100' shown in FIG. 5F, the hollow passageways 125 shown in FIG. 2F are arranged slanted inwardly from the second ends 125B toward the first ends 125A. Typically, the taper angle is about 30 degrees, and the angle of slant with respect to the horizontal axis ("H-H" in FIG. 7A) is about 75 degrees.

Figure 4A:
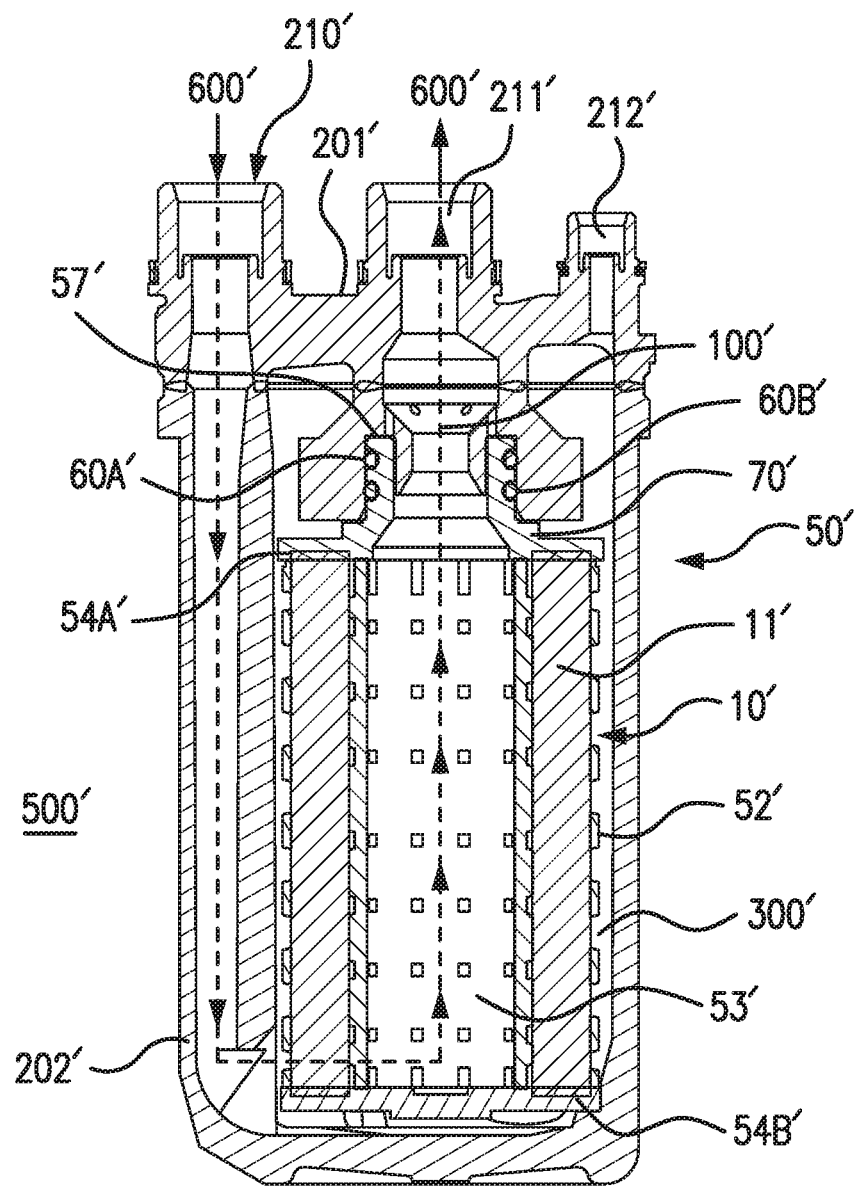
Figure 4B:
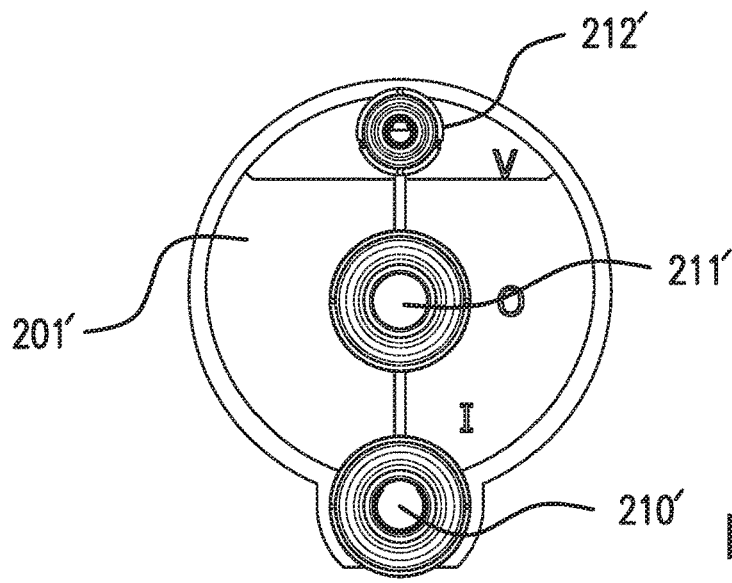
Figure 4C:
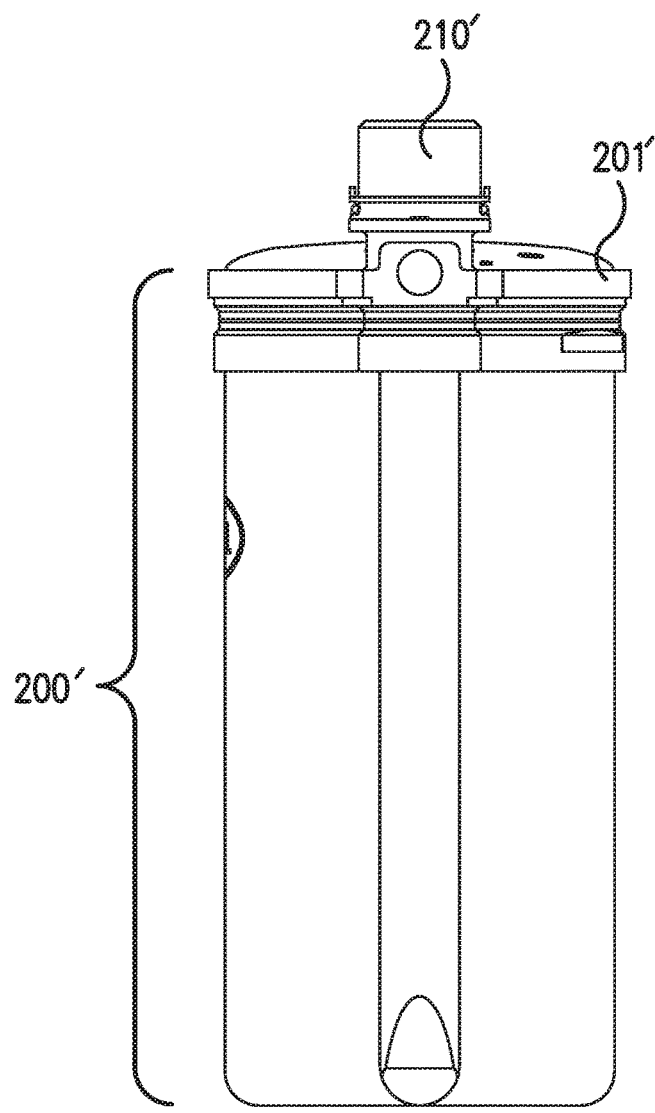

FIG. 4A is cross-sectional view of another embodiment of a filter device 500' including an adapter 100' according to another embodiment of the invention, wherein the adapter is welded to the filter device housing 200', and the adapter is sealed to an end of the filter 50'. FIG. 4B is a top view of the head 201' of the filter device, and FIG. 4C is a left side view of the filter device showing the filter device housing.

Figure 6:
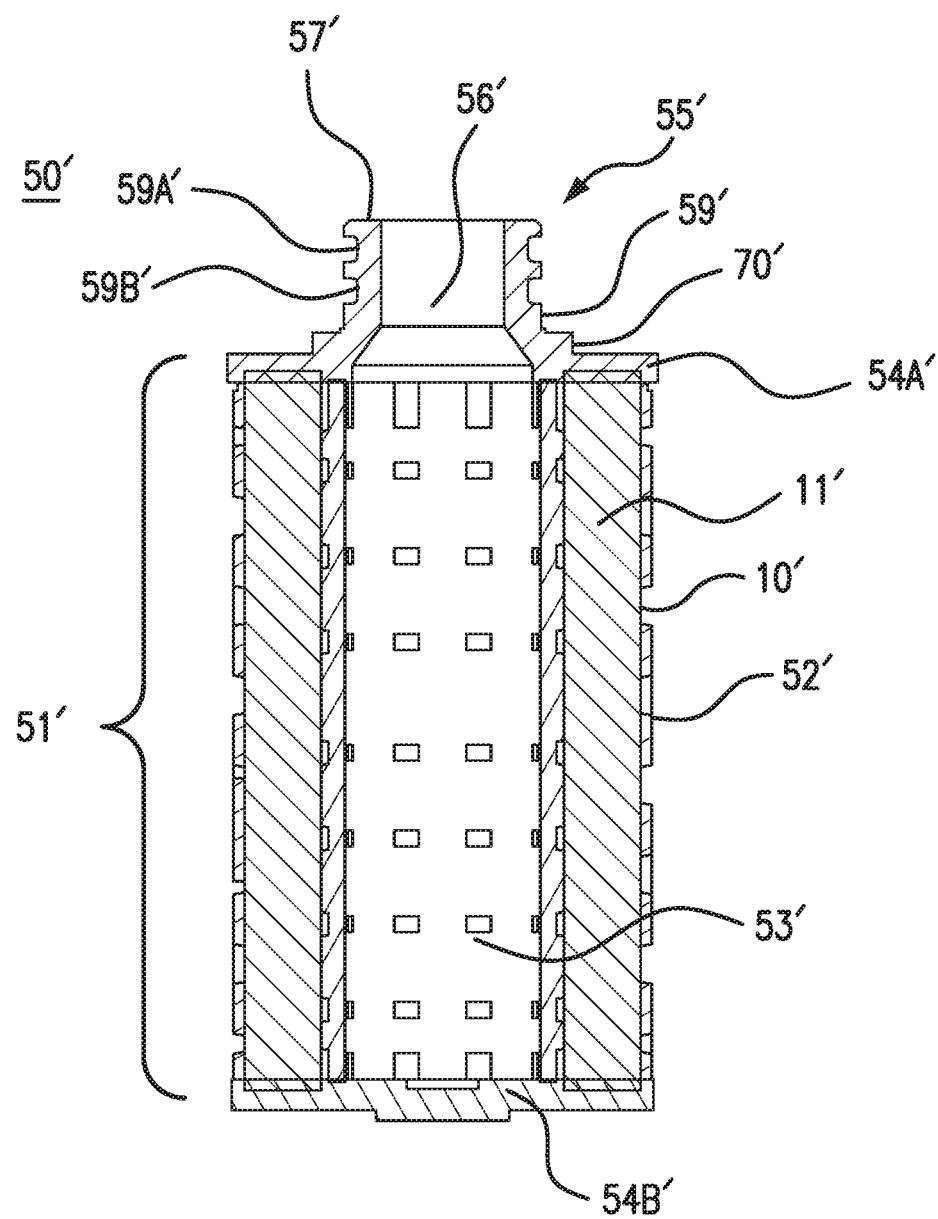
FIG. 6 is a cross-sectional view of the filter in the filter device shown in FIG. 4A.

In accordance with the embodiment shown in FIG. 4A, the filter device 500' comprises a filter device housing 200' comprising a head 201' including an inlet port 210' and an outlet port 211', and a bowl 202' having an interior 300' for receiving a filter 50' (shown in more detail in FIG. 6), the filter comprising a hollow cylindrical filter element 10' comprising a porous medium 11', arranged in a filter housing 51' comprising an outer cage 52', an inner core 53', a first end cap 54A', and a second end cap 54B', wherein the outer cage and inner core are sealed to the first end cap and the second end cap with the filter element between the outer cage and the inner core, the second end cap comprising a closed end cap and the first end cap comprising an open end cap including a hollow projection 55' comprising a filter outlet 56', the hollow projection having a top wall 57', an inner wall 58', and an external wall 59' including grooves 59A', 59B', for receiving resilient members 60A', 60B', shown as o-rings.

In accordance with this illustrated embodiment, an adapter 100' (shown in more detail in FIGS. 5A-5F) comprises a hollow body 101' having a top portion 110' having a top portion tapered inner diameter 111', wherein the top portion tapered inner diameter has a maximum diameter 111A' and a minimum diameter 111B'; a bottom portion 150'; and a central fluid flow port 130' passing through the hollow body 101', the central fluid flow port having a first end 131' and a second end 132', an inside wall 133A' and an outside wall 133B', the central fluid flow port 130' being in fluid communication with the filter outlet 56'; the top portion 110' including a downwardly inwardly slanted inner wall 120' providing the top portion tapered inner diameter 111', the downwardly slanted inner wall 120' being connected to the first end 131' of the central fluid flow port at the minimum diameter 111B' of the top portion tapered inner diameter, the downwardly slanted inner wall having an upper surface 121' and two or more hollow passageways 125' (6 passageways are illustrated) passing through the upper surface 121' of the downwardly slanted inner wall, each of the two or more hollow passageways 125' including an upper passageway end 125A' and a lower passageway end 125B', the upper surface 121' of the downwardly slanted inner wall including the upper passageway ends 125A'; the bottom portion 150' including a downwardly extending hollow tubular element 151' including the second end 132' of the central fluid flow port, the hollow tubular element 151' providing the inside wall 133A' and outside wall 133B' of the central fluid flow port 130'; the bottom portion 150' including an annular channel 160' surrounding the downwardly extending hollow tubular element 151', the annular channel comprising a base 161', an outer side wall 162', and an inner side wall 163' comprising the outside wall 133B' of the central fluid flow port, the base 161' of the annular channel 160' including the lower passageway ends 125B' of the two or more hollow passageways 125'.

Embodiments of the invention can include any number of hollow passageways in the adapter 100, 100'.

Optionally, embodiments of the adapter, filter and/or filter device can include additional components such as one of more external tabs protruding from the external wall of the adapter (e.g., the embodiment shown in FIGS. 2A-2F shows 3 tabs 190 to maintain spacing between the adapter and the inside of the bowl, as well as a plurality of feet (3 feet 191 are illustrated in the embodiment shown in FIGS. 2A-2F) to provide spacing between the bottom portion 150 of the adapter 100 and the top surface of the first end cap 54A. Alternatively, or additionally, other optional components include a downwardly projecting collar on the bottom portion of the adapter (e.g., illustrated as 180 in the embodiment of the adapter shown in FIGS. 2A-2F) providing a spacer, and/or an upwardly projecting collar on the upper portion of the adapter (e.g., shown as 195 in embodiment shown in FIGS. 2A-2F and shown as 195' in the embodiment shown in FIGS. 5A-5D; in some embodiments, 195/195' provide the same cubic volume as the projecting collar on the opposite side of the head (see, for example, FIG. 4A) to provide the same depth of melting area during welding). In the embodiment of the filter shown in FIGS. 4A and 6, the first end cap 54A' includes an optional collar 70' providing a shoulder for seating the bottom portion of the adapter 100'.

Typically, the outer appearance of the top portion 110, 110' (e.g., below collar 195, 195') has a general dome shape, thus reducing material needed while providing for efficient heat shielding and welding.

As discussed in more detail below, as the adapter 100, 100' is assembled in the filter device housing 200, 200' dead space is reduced as air present in the filter device housing is passed through the hollow passageways 125, 125' (see also, FIG. 7A) and through the outlet port 211, 211' after feet 191 (if present) contact the first end cap 54A with some clearance between the top wall 57, 57' of the outlet 56, 56' and the base 161, 161' of the annular channel 162, 162', and the adapter is welded (e.g., via platen welding) to the filter device housing head 201, 201', preferably wherein the head 201, 201' is welded to the bowl 202 at the same time, and, due to the presence of the resilient members 60A, 60B, 60A', 60B', the outer side wall 162, 162' is sealed against the hollow projection 55, 55' comprising the filter outlet 56, 56'. The adapter 100, 100' provides a heat shield to prevent thermal damage to the filter outlet 56, 56'/end cap 54A, 54A' during welding.

Figure 7B:
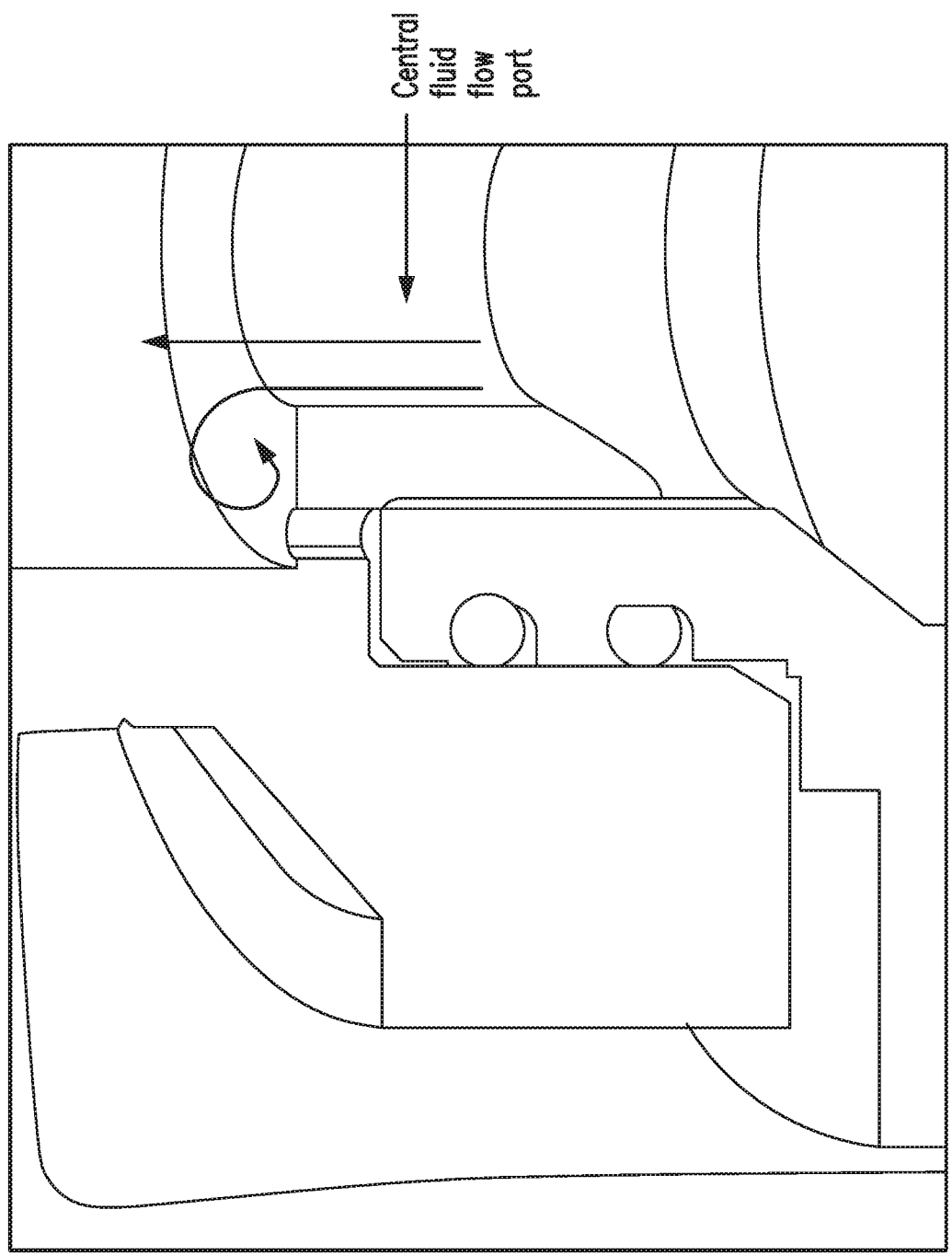
FIG. 7B is a partial diagrammatic view of illustrative flow along a central fluid flow path of an adapter lacking a downwardly slanted inner wall and hollow passageways.

Subsequently, after the filter device is assembled, dead space is further reduced during filtration; without being bound to any particular theory, it is believed that dead space is reduced as the downwardly slanted inner wall (see, FIG. 7A) minimizes whirls of flow and stagnation areas that could occur in the absence of the downwardly slanted inner wall (see, FIG. 7B showing possible whirls of flow and stagnation areas).

Typically, the oblique angle of the inwardly and downwardly slanted inner wall, with respect to a center line of the shape of the hollow passageways 125, 125' is in the range of from about 30 degrees to about 60 degrees. Advantageously, fluid communication between the central fluid flow port 130 and the hollow passageways 125 by the about 30 degree to about 60 degree angle also reduces dead space.

In use, a fluid flow path 600, 600' passes though the filter device 500, 500' via the inlet port 210, 210', the optional outer cage 52, 52' (if present), the porous medium 11, 11', the optional inner core 53, 53' (if present), the filter outlet 56, 56', the adapter central fluid flow port 130, 130', and the outlet port 211, 211'. If desired, the filter device can be vented through vent port 212, 212'. For example, a conduit can be connected to the vent port, and a flow control device such as a valve can be associated with the conduit to allow or stop flow through the vent port and conduit.

A variety of fluids can be filtered in accordance with embodiments of the invention. In one embodiment, the filter is used for filtering fluid for the microelectronics industry (for example, in the preparation of wafers), e.g., fluids including one or more of any of the following: ammonium hydroxide, hydrochloric acid, hydrogen peroxide, and deionized water. For example, the filter can be used with chemical cleaning chemistries such as ammonium hydroxide hydrogen peroxide mixture (SC-1), and hydrochloric acid peroxide mixture (SC-2).

The filter can include additional elements, layers, or components, that can have different structures and/or functions, e.g., at least one of any one or more of the following: prefiltration, support, drainage, spacing and cushioning. Illustratively, the filter can also include at least one additional element such as a mesh and/or a screen.

Preferably, the filter device is sterilizable. Any housing of suitable shape and providing at least one inlet and at least one outlet may be employed.

The filter device housing and filter housing can be fabricated from any suitable impervious polymeric material which is compatible with the fluid being processed. In a preferred embodiment, the filter device housing is fabricated from a fluoropolymer, preferably a perfluoroalkoxy alkane (PFA), and at least the end caps of the filter housing are fabricated from polypropylene or polyethylene.

The following example further illustrates the invention but, of course, should not be construed as in any way limiting its scope.

EXAMPLE

This example shows the improvement in liquid displacement in filter devices including an adapter with hollow passageways according to an embodiment of the invention, compared to filter devices including an adapter without hollow passageways.

Five filter devices each including an adapter with hollow passageways as generally shown in FIGS. 4A and 5A-5E are produced. Another 5 filter devices are produced each including an adapter similar to that illustrated in FIGS. 5A-5E, but without hollow passageways.

The adapters are attached on the filters and installed into the bowl, followed by platen welded with the heads and bowls.

The filter devices are installed in parallel, and cleaned with 3.5% hydrochloric acid, followed by flushing with deionized water. The flow rate is about 24 liters/min, and the resistivity of the filtered fluid is monitored. The process is stopped when the resistivity is over 15 mega ohm centimeters.

The 5 filter devices with adapters without hollow passageways provide fluid with a resistivity of over 15 mega ohm centimeters within 4 hours. The 5 filter devices with adapters according to an embodiment of the invention provide fluid with a resistivity of over 17.5 mega ohm centimeters within 1 hour, thus showing improved liquid displacement.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A filter device comprising:
   (a) a filter comprising a hollow cylindrical filter element comprising a porous medium, arranged in a filter housing comprising an outer cage, an inner core, a first end cap, and a second end cap, wherein the outer cage and inner core are sealed to the first end cap and the second end cap with the filter element between the outer cage and the inner core, the second end cap comprising a closed end cap and the first end cap comprising an open end cap including a hollow projection comprising a filter outlet, the hollow projection having an external wall;
   (b) a filter device housing comprising a head including an inlet port and an outlet port, and a bowl having an interior for receiving the filter;
   (c) an adapter comprising a hollow body having:
      (i) a top portion having a top portion tapered inner diameter, wherein the top portion tapered inner diameter has a maximum diameter and a minimum diameter;
      (ii) a bottom portion; and
      (iii) a central fluid flow port passing through the hollow body, the central fluid flow port having a first end and a second end, an inside wall and an outside wall, the central fluid flow port being in fluid communication with the filter outlet;
      the top portion including a downwardly slanted inner wall providing the top portion tapered inner diameter, the downwardly slanted inner wall being connected to the first end of the central fluid flow port at the minimum diameter of the top portion tapered inner diameter, the downwardly slanted inner wall having an upper surface and two or more hollow passageways passing through the upper surface of the downwardly slanted inner wall, each of the two or more hollow passageways including an upper passageway end and a lower passageway end, the upper surface of the downwardly slanted inner wall including the upper passageway ends;
      the bottom portion including a downwardly extending hollow tubular element including the second end of the central fluid flow port, the hollow tubular element providing the inside wall and outside wall of the central fluid flow port; the bottom portion including an annular channel surrounding the downwardly extending hollow tubular element, the annular channel comprising a base, an outer side wall, and an inner side wall comprising the outside wall of the central fluid flow port, the base of the annular channel including the lower passageway ends of the two or more hollow passageways;
      wherein the outer side wall of the annular channel seals against the external wall of the hollow projection comprising the filter outlet, and the adapter is welded to the filter device housing head and to the top portion of the adapter; and
      wherein a fluid flow path passes though the inlet port, the outer cage, the porous medium, the filter outlet, the adapter central fluid flow port, and the outlet port.

2. The filter device of claim 1, wherein the filter device housing head and the adapter each comprise a fluoropolymer.

3. The filter device of claim 1, wherein the first end cap comprises polypropylene or polyethylene.

4. The filter device of claim 1, wherein the two or more hollow passageways are slanted with respect to a horizontal axis of the adapter.

5. An adapter for use in a filter device having a filter outlet comprising:
   a hollow body having:
      (i) a top portion having a top portion tapered inner diameter, wherein the top portion tapered inner diameter has a maximum diameter and a minimum diameter;
      (ii) a bottom portion; and
      (iii) a central fluid flow port passing through the hollow body, the central fluid flow port having a first end and a second end, an inside wall and an outside wall, the central fluid flow port being in fluid communication with the filter outlet;

the top portion including a downwardly slanted inner wall providing the top portion tapered inner diameter, the downwardly slanted inner wall being connected to the first end of the central fluid flow port at the minimum diameter of the top portion tapered inner diameter, the downwardly slanted inner wall having an upper surface and two or more hollow passageways passing through the upper surface of the downwardly slanted inner wall, each of the two or more hollow passageways including an upper passageway end and a lower passageway end, the upper surface of the downwardly slanted inner wall including the upper passageway ends;

the bottom portion including a downwardly extending hollow tubular element including the second end of the central fluid flow port, the hollow tubular element providing the inside wall and outside wall of the central fluid flow port; the bottom portion including an annular channel surrounding the downwardly extending hollow tubular element, the annular channel comprising a base, an outer side wall, and an inner side wall comprising the outside wall of the central fluid flow port, the base of the annular channel including the lower passageway ends of the two or more hollow passageways.

6. The adapter of claim 5, wherein the two or more hollow passageways are slanted with respect to a horizontal axis of the adapter.

7. A method of filtering fluid, the method comprising: passing the fluid through the filter device of claim 1.

8. The method of claim 7, wherein the fluid is used in the microelectronics industry.

9. A method of cleaning a filter, the method comprising:
passing a cleaning fluid through the filter device of claim 1, and,
passing deionized water through the filter device, wherein the cleaning fluid is flushed from the filter device.

10. The filter device of claim 2, wherein the first end cap comprises polypropylene or polyethylene.

11. The filter device of claim 2, wherein the two or more hollow passageways are slanted with respect to a horizontal axis of the adapter.

12. The filter device of claim 3, wherein the two or more hollow passageways are slanted with respect to a horizontal axis of the adapter.

13. The filter device of claim 10, wherein the two or more hollow passageways are slanted with respect to a horizontal axis of the adapter.

14. A method of filtering fluid, the method comprising: passing the fluid through the filter device of claim 2.

15. A method of filtering fluid, the method comprising: passing the fluid through the filter device of claim 3.

16. A method of filtering fluid, the method comprising: passing the fluid through the filter device of claim 4.

17. A method of filtering fluid, the method comprising: passing the fluid through the filter device of claim 10.

18. A method of filtering fluid, the method comprising: passing the fluid through the filter device of claim 11.

19. A method of filtering fluid, the method comprising: passing the fluid through the filter device of claim 12.

20. A method of filtering fluid, the method comprising: passing the fluid through the filter device of claim 13.

* * * * *